United States Patent
Crookston

[15] 3,675,940
[45] July 11, 1972

[54] MOBILE TRASH CART

[72] Inventor: James R. Crookston, 3566 Oak Road, Stow, Ohio 44224

[22] Filed: April 30, 1970

[21] Appl. No.: 33,257

[52] U.S. Cl. ................................280/47.26, 248/98
[51] Int. Cl. ...........................................B62b 1/16
[58] Field of Search ..............280/47.26, 79.2, 47.31; 248/98; 312/200; 332/43.2

[56] References Cited

UNITED STATES PATENTS

| | | | |
|---|---|---|---|
| 1,791,097 | 2/1931 | Jetel | 280/79.2 UX |
| 3,494,541 | 2/1970 | Smedlund | 232/43.2 |
| 2,588,957 | 3/1952 | Brown | 312/200 |
| 810,313 | 1/1906 | Wellman | 280/79.2 |
| 3,218,090 | 11/1965 | Herman | 280/79.2 |
| 3,236,538 | 2/1966 | Johansen | 280/47.31 |

Primary Examiner—Benjamin Hersh
Assistant Examiner—John A. Pekar
Attorney—Oldham & Oldham

[57] ABSTRACT

A mobile trash cart is provided including a two-part container having each part extending the height of the container, hinge means secure the parts together for pivotal movement therebetween, lock means on opposite edges of the container to secure such parts together, and a cart means engages one of the container parts for ready transportation of the container.

2 Claims, 6 Drawing Figures

PATENTED JUL 11 1972 3,675,940

INVENTOR.
JAMES R. CROOKSTON
BY Oldham & Oldham
ATTORNEYS 3,675,940

MOBILE TRASH CART

This invention relates to mobile trash and refuse containers or carts, and especially to an improved mobile trash cart characterized by the ease of unloading the contents thereof.

BACKGROUND OF THE INVENTION

Heretofore there have been several different attempts made to provide mobile trash or garbage carts and these prior efforts have included a garbage can dolly as shown in U.S. Pat. No. 3,310,318, and a special trash handling and burning member that is positioned upon a movable dolly in U.S. Pat. No. 3,207,104. U.S. Pat. No. 3,041,026 is one example of a mobile cart for securing or carrying a trash receiving sack or container thereon.

While the prior art has provided some mobile trash carts, none of these carts have been of a construction whereby it is easy to remove the trash or refuse from the cart even though convenient transportation of rubbish from one place to another may be provided by the prior types of carts.

The general object of the present invention is to provide a novel and improved mobile trash cart characterized by making the container from two parts that are pivotally associated with each other to facilitate access to the interior of the trash receiving container.

Another object of the invention is to provide a relatively inexpensive, sturdy trash cart which is particularly adapted for receiving a removable liner or sack therein for receipt and transport of trash and refuse therein and for conveniently discharging the contents of the container by removal of the sack.

Yet another object of the invention is to provide improved trash receiving and transporting means involving use, usually, of a cylindrical two-part container having wheels attached to just one part of the container, and normally having support means on the base of the other container part.

Another object of the present invention is to provide an improved mobile trash cart having two parts in the container of the car and having a vertically extending hinge means provided thereon whereby the trash cart container can be closed for trash receipt and transport, and be opened for facilitating removal of trash therefrom, which container is adapted to retain a liner therein open for receiving trash therein, the liner being readily removable from the container without being lifted therefrom.

The foregoing and other objects and advantages of the invention will be made more apparent as the specification proceeds.

Attention now is directed to the accompanying drawings, wherein.

When referring to corresponding members shown in the drawings and referred to in the specification, corresponding numerals are used to facilitate comparison therebetween.

PATENTABLE SUBJECT MATTER

Figures 1, 2:
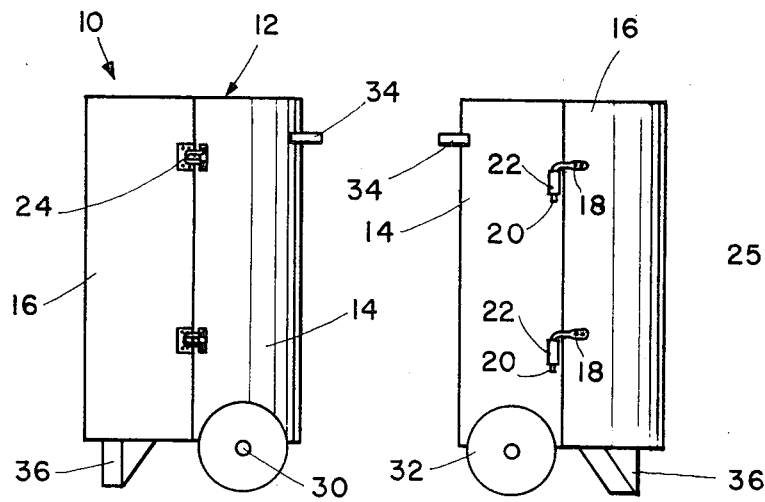
FIG. 1 is an elevational view of one embodiment of the mobile trash cart of the invention taken from one side thereof.
FIG. 2 is a side elevation of the cart of FIG. 1 taken from the opposite side thereof.
Figure 5:
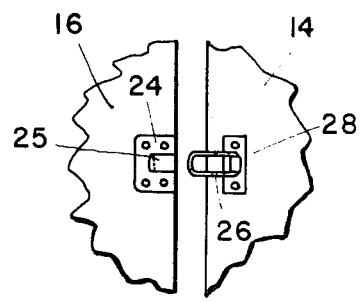
FIG. 5 is a fragmentary enlarged view of the locking means of the container.

The present invention, as one embodiment thereof, provides a trash cart including a two-part container each of which forms substantially one-half of the container and with the container parts being split on vertical axes, hinge means secure adjacent edges of the parts of the container together for pivotal movement therebetween, lock means are provided on the other pair of adjacent vertical edges of the container parts for securing the container parts together, a cart means supporting one of the container parts for transport of the article of the invention, and a support means on the other of the container parts to facilitate stabilizing the position of the trash cart when one container part is open.

Reference now is particularly directed to the details of the structure shown in the accompanying drawings, and a mobile trash cart is indicated as a whole by the numeral 10. Such trash cart 10 includes a container 12 which is made from two parts or container sections 14 and 16 with each container part extending the height of the container and preferably forming substantially one-half of the container. This container 12 normally is cylindrical and can be made from any suitable material such as plastic or any desired metal and would be made in accordance with conventional practices.

The drawings clearly show that vertical edges of the two container sections or parts 14 and 16 are vertically adjacent each other when the container is in its closed, operative position and thus any conventional hinge means are used to secure the sections or parts 14 and 16 together pivotally for movement to and from closed positions. One preferred type of a simple hinge member comprises hinge rods 18 that are suitably secured to the container section 16 and have dependent ends 20 provided thereon offset from the adjacent vertical margin of the container section 16 to which the hinge rods are secured. These dependent rod ends or members 20 extend vertically of the container and are received, for example, in a pair of vertically spaced U-shaped brads or fasteners 22 that are secured to the section 14 and protrude therefrom. The rod ends 20 pivotally engage the fasteners 22 whereby the container section or part 16 can be swung away from engagement with the associated section or part 14, when desired.

In order to retain the container sections together, some suitable quickly releasable lock means are provided at the other pair of adjacent vertical margins of the container parts or sections, and thus FIG. 1 shows that a suitable lock bracket 24 is secured to the container section 14 adjacent upper and lower vertical margins thereof. A companion lock member, such as a loop member 26, pivotally carried by a securing bracket or plate 28, is attached to correspondingly vertically spaced portions on the container section 16. Hence, the hook 26 can be readily engaged with a lock section 25 formed on the lock bracket 24 to secure the container parts together in a convenient, easily locked and released manner.

So as to facilitate movement of the container 12 from one place to another, any suitable cart means, such as an axle 30, are secured to the bottom of the container section or part 14 and a pair of wheels 32 are journalled on this axle 30 at the ends thereof. Likewise, to facilitate transporting the trash cart 10 from one place to another, a handle 34 is secured to an upper end portion of the container section 14 whereby the container 12 can be tilted out of a vertical position and readily trundled from one location to another.

Figure 3:
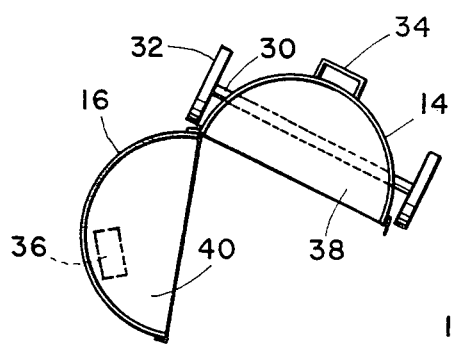
FIG. 3 is a plan view of the mobile cart of FIG. 1 with one portion thereof being in its opened position.

When the trash cart 10 is stationarily positioned, a support 36 which is attached to and extends downwardly from the container section 16 is brought into use and the trash cart will stand in an upright position. If desired, this support 36 can be in an offset position in relation to the center of the container section or part 16 and thus it may be positioned as indicated in FIG. 3. Or, a support may be attached to the part 14 at a margin thereof spaced from the wheels 32. In this manner, a bottom section 38 is provided for the container 14 and another bottom portion 40 is provided for the container section 16 to form a full bottom for the container when in operative use.

Figure 6:
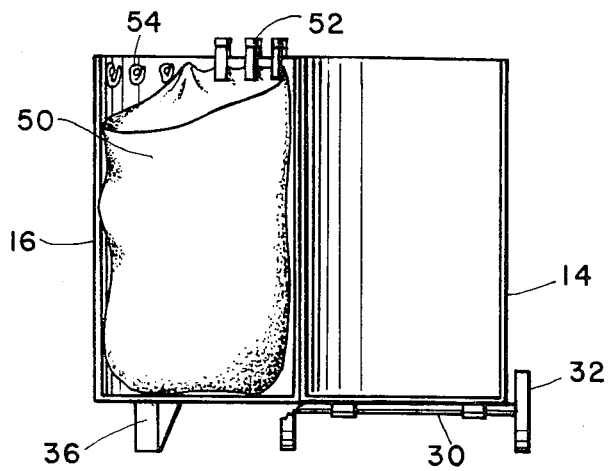
FIG. 6 is a side elevation of the trash cart of FIG. 1 in its opened position and indicating means for attaching a liner in position in the container.

Preferably in use of the container 12, it is desired to provide removable liner therein for receipt of trash or rubbish to be transported. Thus, this liner 50 is shown in FIG. 6 and the liner may be secured to the top of the container 12 in any suitable manner, as by affixing the liner to the container by clothespins 52 or other removable means, or prongs 54 can be provided adjacent the upper edges of the container parts to have the liner 50 secured thereto and open the top of the liner for receipt of trash or rubbish.

It also is possible to just fold the top of the liner 50 downwardly around the upper edges of the container 12 and retain the liner in position in such manner or by securing the liner by the clothespins. The liner 50 can be made from any desired material such as a fabric sack or bag, or else plastic liners of suitable size and composition can be provided. Normally, it is desired that the liner would be at least as big as the container 12 whereby any loaded portion of the liner would be reinforced by the container and the liner would not be torn readily.

Figure 4:
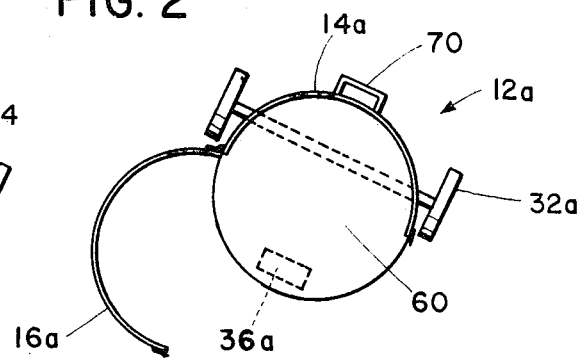
FIG. 4 is a view similar to FIG. 3 but of a modified embodiment of the mobile trash cart of the invention.

A modified two-part container 12a is shown in FIG. 4. In this instance, a container section 14a has a full disc bottom 60 secured thereto and adapted to engage a second section 16a to form an enclosed container. The parts are hinged together and can receive a liner therein as in the container 12.

The containers 12 and 12 may be of square or other shape in section, as desired.

A suitable handle 70 is provided on the part 14 to facilitate tilting and moving the container 12.

Obviously only one locking means assembly of any known type may be used in place of the two lock means shown.

Naturally, when it is desired to unload the trash cart 10, all one needs do is to release the locking means and swing the one container section away from its mate. If a liner is used, then the liner can be slid out of engagement with the container and the trash or rubbish be disposed of in any suitable way without any need to lift the rubbish out of the container.

The hinge means used may be of any desired type and may permit the parts of the container to be disassembled easily, if desired. For example, the rod ends may be in removable or permanent pivotal engagement with the fasteners 22.

The trash cart of the invention is of sturdy construction and can be relatively easily assembled at low cost so that it is believed that the objects of the invention are achieved.

While two complete embodiments of the invention have been disclosed herein, it will be appreciated that modification of these particular embodiments of the invention may be resorted to without departing from the scope of the invention.

What is claimed is:

1. A mobile trash cart adapted to receive a removable liner therein comprising a two-part open top container having each part thereof extending the height of the container and forming substantially one-half of the container, bottom means for the container operatively secured thereto, hinge means securing a pair of adjacent edges of the parts of said container together for pivotal action therebetween, lock means for securing the opposite edges of said container parts together, and a cart means operatively secured to one of said container parts whereby the trash cart can easily be moved around for matter to be placed in a liner in the cart, the cart can be opened when desired, and the liner with matter therein can readily be slid off the bottom means, said cart means being offset from the center of said container and being under said one container part, and said bottom means comprises a full bottom member for said container secured to the container part having said cart means secured thereto.

2. A mobile trash cart adapted to receive a removable liner therein comprising a two-part open top container having each part thereof extending the height of the container and forming substantially one-half of the container, bottom means for the container operatively secured thereto, hinge means securing a pair of adjacent edges of the parts of said container together for pivotal action therebetween, lock means for securing the opposite edges of said container parts together, and a cart means operative secured to one of said container parts whereby the trash cart can easily be moved around for matter to be placed in a liner in the cart, the cart can be opened when desired, and the liner with matter therein can readily be slid off the bottom means, said bottom means comprises a bottom section for each part of said container secured thereto, and a support means is secured to the second of said container parts.

* * * * *